BEST AVAILABLE COPY

BEST AVAILABLE COPY

T. SHAW.

Power Hammer.

No. 2,398. Reissued Nov. 27, 1866.

WITNESSES

Chas. L. Shaw

H. C. Justice

INVENTOR

Thomas Shaw

N. PETERS, Photo-Lithographer, Washington, D. C.

BEST AVAILABLE COPY

UNITED STATES PATENT OFFICE.

PHILIP S. JUSTICE, OF PHILADELPHIA, PENNSYLVANIA, ASSIGNEE OF THOMAS SHAW.

IMPROVEMENT IN POWER-HAMMERS.

Specification forming part of Letters Patent No. 52,894, dated February 27, 1866; Reissue No. 2,398, dated November 27, 1866.

*To all whom it may concern:*

Be it known that THOMAS SHAW, of the city and county of Philadelphia, State of Pennsylvania, has invented a new and Improved Mode of Constructing Power-Hammers; and I do hereby declare that the following is a full, clear, and exact description of the same, reference being had to the accompanying drawings, and to the letters of reference marked thereon.

The said invention of said SHAW consists in suspending a vibrating hammer to a spring with a flexible belt, by means of which a greatly-increased force and momentum can be obtained from the blow of the hammer without the danger which attends the use of other hammers when driven with equal rapidity.

In order to enable others to use and practice the said invention, I will proceed to describe its construction and operation.

Figure 1:
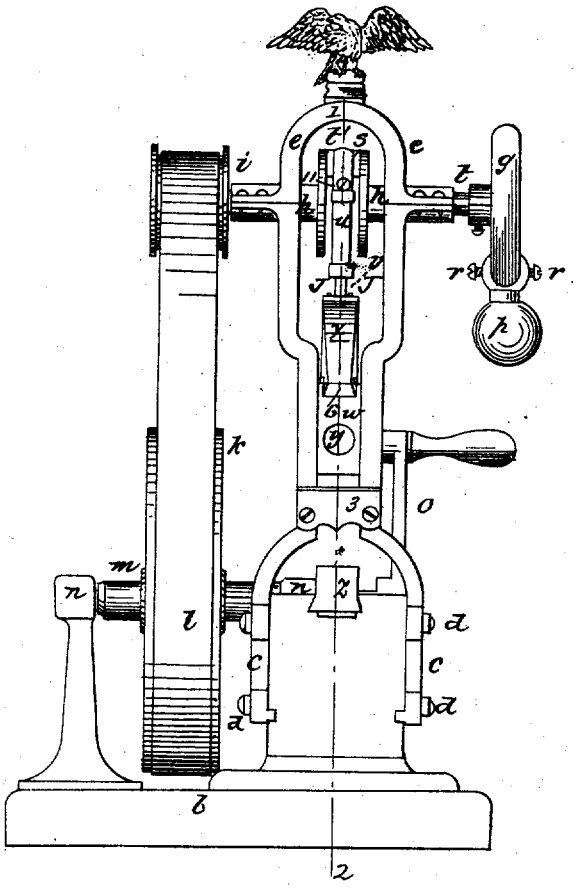
Figure 2:
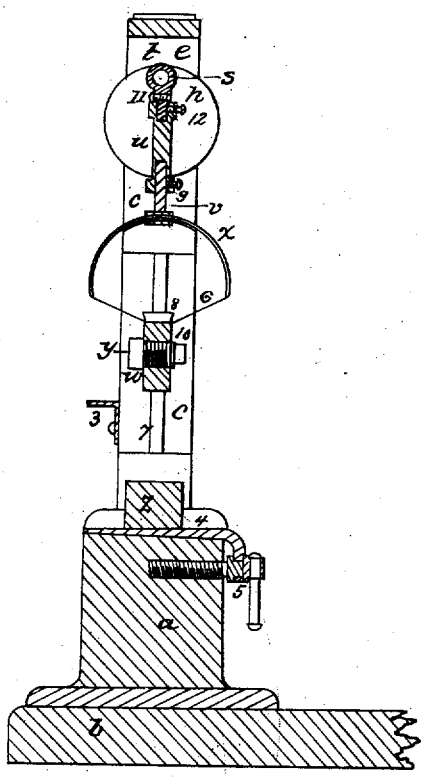

On reference to the accompanying drawings, which form a part of this specification, Figure 1 is a front view. Fig. 2 is a vertical section on the line 1 and 2.

Similar letters refer to similar parts throughout the several views.

*a* is the anvil-block, secured to wood base *b* by wood-screws.

*c c* are guide-rods extending up to cap *e*, to which they are united by means of small screws, and at which point is formed the journal for shaft *f*, for the purpose as hereinafter described. Said guide-rods *c c* are secured to anvil *a* by means of screws *d d*.

*n n* are two pillars supporting shaft *m*, to which are secured main driving-pulley *k* and [illegible] for the purpose of communicating [illegible] the hammer through belt *l* when said [illegible] operated by the hand. Shaft *f* has [illegible] and carries fly-wheel *j*, counter-[illegible], crank-disks *h h*, and belt-wheel *i*, [illegible] purpose as hereinafter described.

[illegible] a metallic spring secured to rod *v*, which [illegible]ters hollow rod *u*, and to which it is secured by set-screw *g*. The upper end of hollow rod *u* has a split-box journal, *t'*, held together by screw 11, and grasps crank-pin *s*.

*w* is the hammer, secured on its upper end to belt 6 by wedge 8. Said belt is secured to spring *x* by means of screws J J, all for the purpose as hereinafter described.

3 is a shield to prevent heat from burning the belt *z*. The die is secured to anvil *a* by means of wedge 4 and screw 5, as hereinafter described.

The hammer *w* can be made to strike high or low by means of lengthening or shortening rod *v* by screw J. The weight of hammer can be regulated by means of plug *y* being inserted into or taken from the hammer, which alters the weight in proportion. In order to prevent plug from unscrewing itself, pin 10 is inserted. Spring *x* and belt 6, in combination with crank-pin and rod *u*, give the hammer a free and elastic motion. It is also durable, as the belt is not affected by the sudden vibration of the hammer. Wedge 4 secures die *z* by being forced under it by means of screw 5.

The object of counter-balance *p* is to lift the hammer off the anvil-block when stopping. This can also be effected by means of a spring pulling on a crank-pin in the desired direction.

The hammer is put in operation in this wise: On motion being applied to cranks *o* motion will be communicated to crank-shaft *t* through belt *l*, when the hammer *w* will have a perpendicular vibratory motion of twice the stroke of the crank.

What is claimed as the invention of said SHAW, and desired to secure by Letters Patent, is—

The combination of a vibratory hammer with the spring and flexible belt, substantially as described.

PHILIP S. JUSTICE.

Witnesses:

JOHN WHITE,

GEO. R. TAYLOR.